US008226475B2

(12) United States Patent
Trobia

(10) Patent No.: US 8,226,475 B2
(45) Date of Patent: Jul. 24, 2012

(54) GAMING DEVICE WITH FACSIMILE GRAPHICAL USER INTERFACE

(75) Inventor: Andrew G. Trobia, Des Plaines, IL (US)

(73) Assignee: WMS Gaming Inc., Waukegan, IL (US)

( * ) Notice: Subject to any disclaimer, the term of this patent is extended or adjusted under 35 U.S.C. 154(b) by 1130 days.

(21) Appl. No.: 11/576,391

(22) PCT Filed: Sep. 29, 2005

(86) PCT No.: PCT/US2005/034769

§ 371 (c)(1),
(2), (4) Date: Sep. 10, 2007

(87) PCT Pub. No.: WO2006/039322

PCT Pub. Date: Apr. 13, 2006

(65) Prior Publication Data

US 2008/0200245 A1 Aug. 21, 2008

Related U.S. Application Data

(60) Provisional application No. 60/615,142, filed on Oct. 1, 2004.

(51) Int. Cl.
*G06F 17/00* (2006.01)

(52) U.S. Cl. ................ 463/30; 463/16; 463/17; 463/18; 463/19; 463/20; 463/25; 463/29; 463/31; 463/33; 463/34; 700/15

(58) Field of Classification Search .............. 463/16–20, 463/25, 29–34; 700/715; 710/8–19, 62–64
See application file for complete search history.

(56) References Cited

U.S. PATENT DOCUMENTS 4,709,366 A 11/1987 Scott et al.
4,791,356 A 12/1988 Warren et al.
5,157,668 A 10/1992 Buenzil et al.
5,640,098 A 6/1997 Niijima et al.
5,836,819 A * 11/1998 Ugawa ............................ 463/30
6,251,014 B1 * 6/2001 Stockdale et al. .............. 463/16
6,438,973 B1 8/2002 Yoshida et al.
2002/0138184 A1 9/2002 Kipersztok et al.
2004/0072611 A1 4/2004 Wolf et al.
(Continued)

FOREIGN PATENT DOCUMENTS

WO WO-9820949 A1 5/1998

OTHER PUBLICATIONS

"International Search Report for Application No. PCT/US2005/034769, date mailed Oct. 24, 2006", 4 pgs.

(Continued)

*Primary Examiner* — Sunit Pandya
(74) *Attorney, Agent, or Firm* — Schwegman, Lundberg & Woessner, P.A.

(57) ABSTRACT

Systems and methods for operating a gaming machine having with a facsimile graphical user interface are disclosed. The systems and methods include displaying on a graphical object on the gaming machine that represents a physical component of the gaming machine. One aspect of the systems and methods includes selecting the graphical object and initiating an action for the physical component represented by the graphical object. A further aspect includes sensing a status for a physical component on the gaming machine and displaying a graphical object representing the status.

20 Claims, 5 Drawing Sheets

U.S. PATENT DOCUMENTS

| | | | |
|---|---|---|---|
| 2004/0140617 | A1 | 7/2004 | Cordell |
| 2005/0164788 | A1 | 7/2005 | Grabiec |
| 2005/0209808 | A1 | 9/2005 | Kelbon et al. |

OTHER PUBLICATIONS

"Written Opinion of the International Searching Authority for Application No. PCT/US2005/034769, date mailed Oct. 24, 2006", 7 pgs.

"U.S. Appl. No. 11/277,063, Advisory Action mailed Dec. 14, 2010", 3 pgs.

"U.S. Appl. No. 11/277,063, Final Office Action mailed Sep. 9, 2010", 11 pgs.

"U.S. Appl. No. 11/277,063, Non Final Office Action mailed Oct. 1, 2009", 7 pgs.

"U.S. Appl. No. 11/277,063, Response filed Apr. 1, 2010 to Non Final Office Action mailed Oct. 1, 2009", 11 pgs.

"U.S. Appl. No. 11/277,063, Response filed Dec. 1, 2010 to Final Office Action mailed Sep. 9, 2010", 11 pgs.

"U.S. Appl. No. 11/277,063, Non Final Office Action mailed Aug. 19, 2011", 8 pgs.

* cited by examiner

GAMING DEVICE WITH FACSIMILE GRAPHICAL USER INTERFACE

RELATED APPLICATION

This application is a U.S. National Stage Filing under 35 U.S.C. 371 from International Patent Application Serial No. PCT/US2005/034769, filed Sep. 29, 2005, and published on Apr. 13, 2006 as WO 2006/039322 A2 and republished Apr. 13, 2006 as WO 2006/039322 A3, which claims the priority benefit of U.S. Provisional Application Ser. No. 60/615,142 filed Oct. 1, 2004, the contents of which are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2005, WMS Gaming, Inc. All Rights Reserved.

FIELD

The present invention relates generally to gaming devices, and more particularly to a gaming device having facsimile graphical user interface.

BACKGROUND

Today's gaming machine typically comprises a computerized system controlling a video display or reels that provide wagering games such as slots, video card games (poker, blackjack etc.), video keno, video bingo, video pachinko and other games typical in the gaming industry. Generally, the popularity of such machines with players is dependent on the likelihood (or perceived likelihood) of winning money at the machine and the intrinsic entertainment value of the machine relative to other available gaming options. Players also appreciate the reliability of a gaming machine, as do the casino operators. Shrewd operators consequently strive to employ the most entertaining, exciting, and reliable machines available because such machines attract frequent play and hence increase profitability to the operator.

When a gaming machine is not operating due to configuration, reconfiguration or component failure, it is not contributing revenue for the owner of the gaming machine. Unfortunately, the software used in previous systems to configure and diagnose problems on a gaming machine may often be responsible for substantial periods of downtime. One problem is the lack of an intuitive interface to verify a configuration and to diagnose problems on a gaming machine. For example, most diagnostic and configuration interface may be text-based, or may even be hardware oriented (e.g. switches used to alter a configuration). Text-based interfaces typically require a significant skill level in order to isolate failures or configuration problems.

SUMMARY

Systems and methods for operating a gaming machine having a far simile graphical user interface are disclosed. The systems and methods include displaying a graphical object on the gaming machine that represents a physical component, feature or aspect of the gaming machine. One aspect of the systems and methods includes selecting the graphical object and initiating an action for the physical component represented by the graphical object. A further aspect includes sensing a status for a physical component on the gaming machine and displaying a graphical object representing the status.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
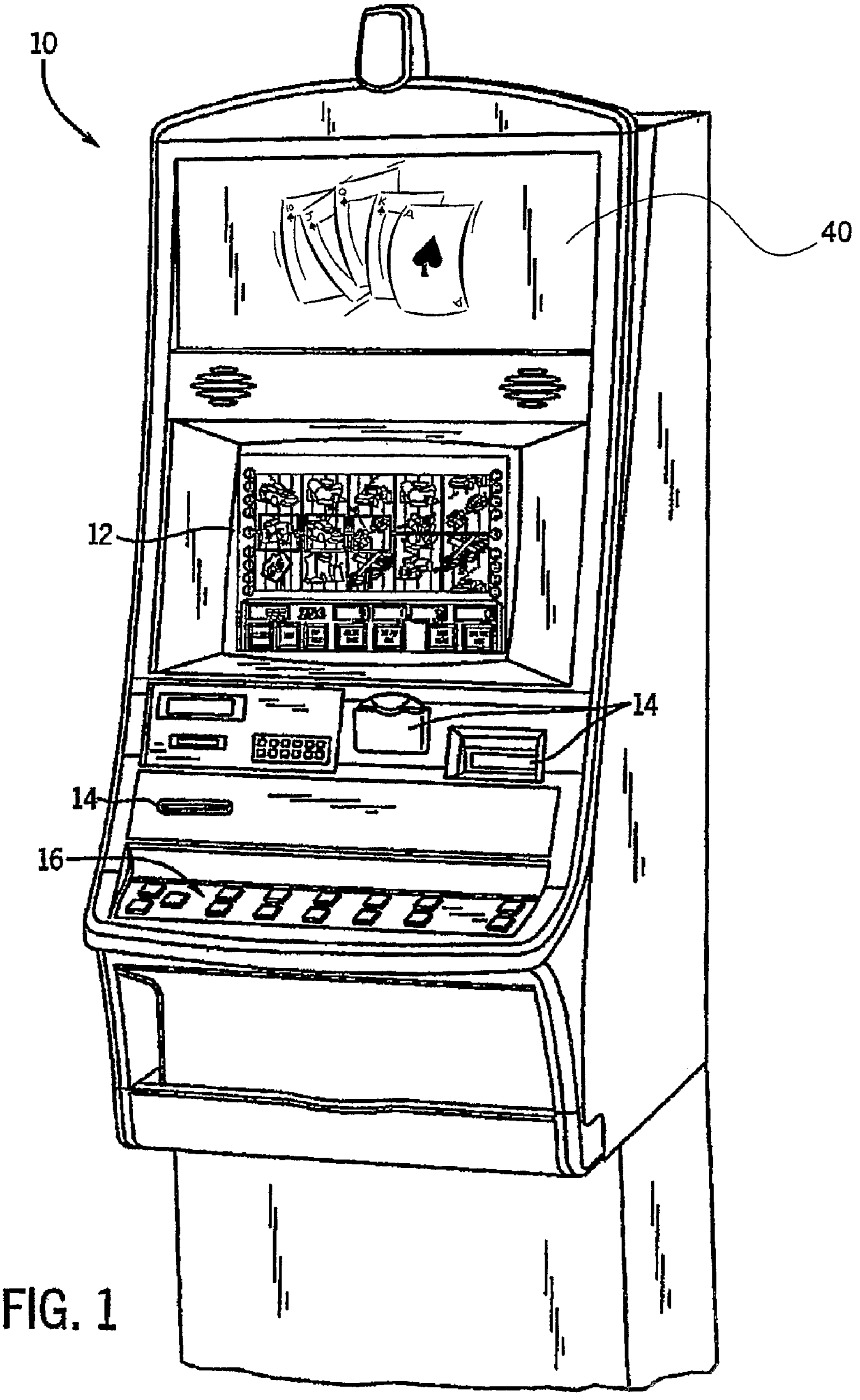
FIG. 1 is a perspective view of an exemplary gaming machine incorporating embodiments of the present invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or futures technologies, which would still fall within the scope of the claims. The following detailed description is, therefore, not to be taken in a limiting sense, and the scope of the present invention is defined only by the appended claims.

Operating Environment

FIG. 1 illustrates an exemplary gaming machine 10, also referred to as a Video Lottery Terminal (VLT), in which embodiments of the invention may be implemented. In some embodiments, gaming machine 10 is operable to conduct a wagering game such as mechanical or video slots, poker, keno, bingo, or blackjack. If based in video, the gaming machine 10 includes a video display 12 such as a cathode ray tube (CRT), liquid crystal display (LCD), plasma, or other type of video display known in the art. A touch screen preferably overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the push-buttons. Other possible user interface devices include a keyboard and a pointing device such as a mouse or trackball.

In some embodiments, gaming machine 10 includes a top box 40. Top box 40 may contain a video display, a mechanical display, or a diorama display that supplements display 12. For example, the display in top box 40 may be a wheel such as a rotating wheel, mechanical dice, a board for a board game, or other such display.

A processor controls operation of the gaming machine 10. In response to receiving a wager and a command to initiate play, the processor randomly selects a game outcome from a plurality of possible outcomes and causes the display 12 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the processor awards the player with a number of credits associated with the winning outcome.

Figure 2:
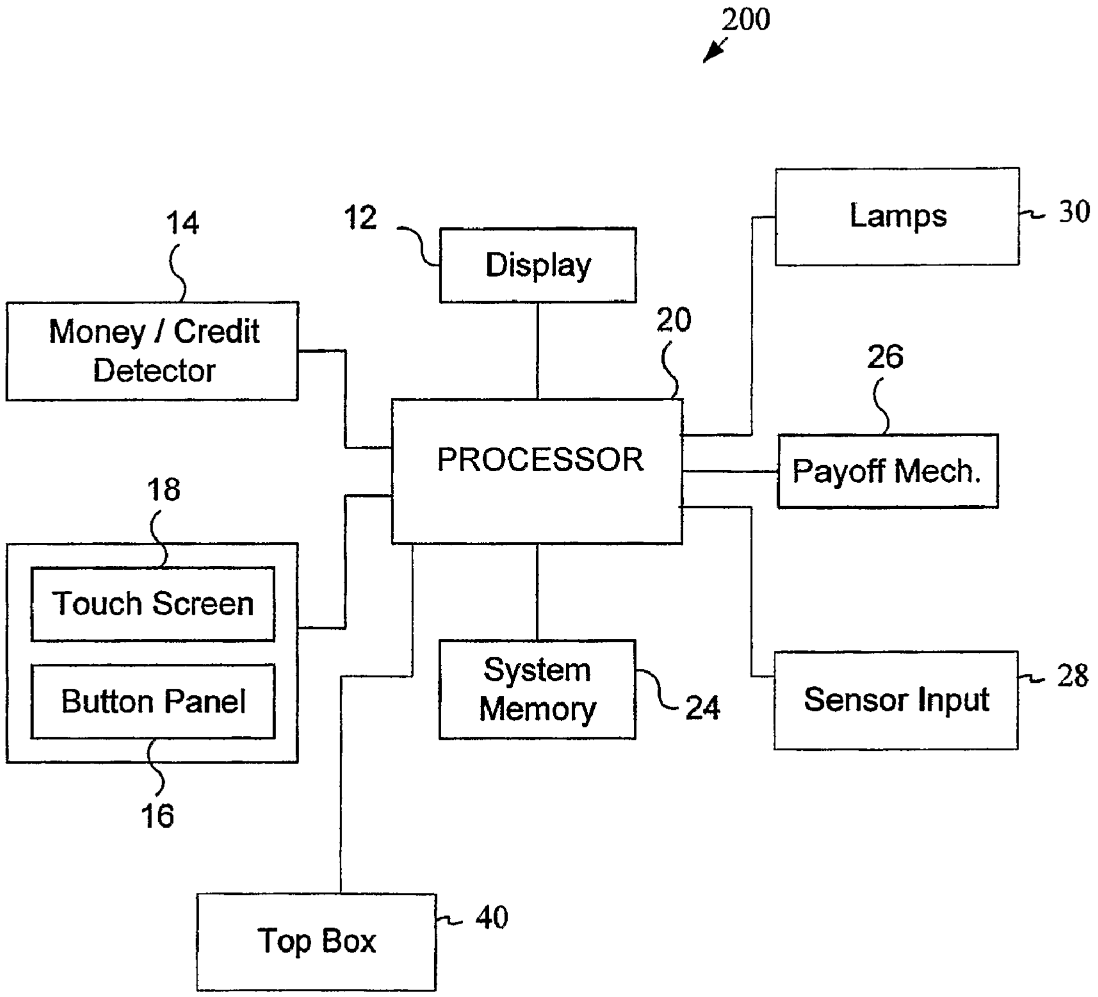
FIG. 2 is a block diagram of a gaming control system suitable for operating the gaming machine in FIG. 1.

FIG. 2 is a block diagram of a control system 200 suitable for operating the gaming machine 10. Money/credit detector 22 signals a processor 20 when a player has inserted money, tickets, tokens, cards or other mechanism for obtaining credits for plays on the gaming machine through credit mechanisms 14. Using a button panel 16 and/or a touch screen 18, the player may select any variables associated with the wagering game and place his/her wager to purchase a play of the game. In a play of the game, the processor 20 generates at least one random event using a random number generator (RNG) and provides an award to the player for a winning outcome of the random event. Alternatively, the random event may be generated by a remote computer using an RNG or pooling schema and then transmitted to the gaming machine. The processor 20 operates the display 12 to represent the random event(s) and outcome(s) in a visual form that can be understood by the player. In addition to the processor 20, the control system may include one or more additional slave control units for operating the display 12 and any secondary displays.

The control system may also include one or more detectors 28. The detectors 28 may be used to receive status on various physical components of the gaming machine. For example, detector 28 may detect that a door is open on the gaming machine. Further, detector 28 may receive status indicating that a coin dispensing unit on the gaming machine is jammed.

Further, the control system may control lamps 30 on the gaming machine. Such lamps include attractor lamps designed to attract potential gaming participants to the gaming machine when the gaming machine not currently in use. These lamps may also be used to enhance the players gaming experience and indicate game status such as spinning or jackpot. Additionally, such lamps include candle lamps that provide status information regarding the gaming machine to casino operator. The control system 30 may also control lamps on some or all of push buttons 16.

Also, the control system 200 may control a top box mechanism 40. The top box mechanism may include a motorized or video display that is activated at predetermined points of a game executed by the gaming machine.

System memory 24 stores control software, operational instructions and data associated with the gaming machine. In one embodiment, the system memory 24 comprises a separate read-only memory (ROM) and battery-backed random-access memory (e.g. RAM, SDRAM etc.). However, it will be appreciated that the system memory 24 may be implemented on any of several alternative types of memory structures or may be implemented on a single memory structure.

A payoff mechanism 26 is operable in response to instructions from the processor 20 to award a payoff to the player. The payoff may, for example, be in the form of a number of credits. The number of credits is determined by one or more math tables stored in the system memory 24.

Figure 3:
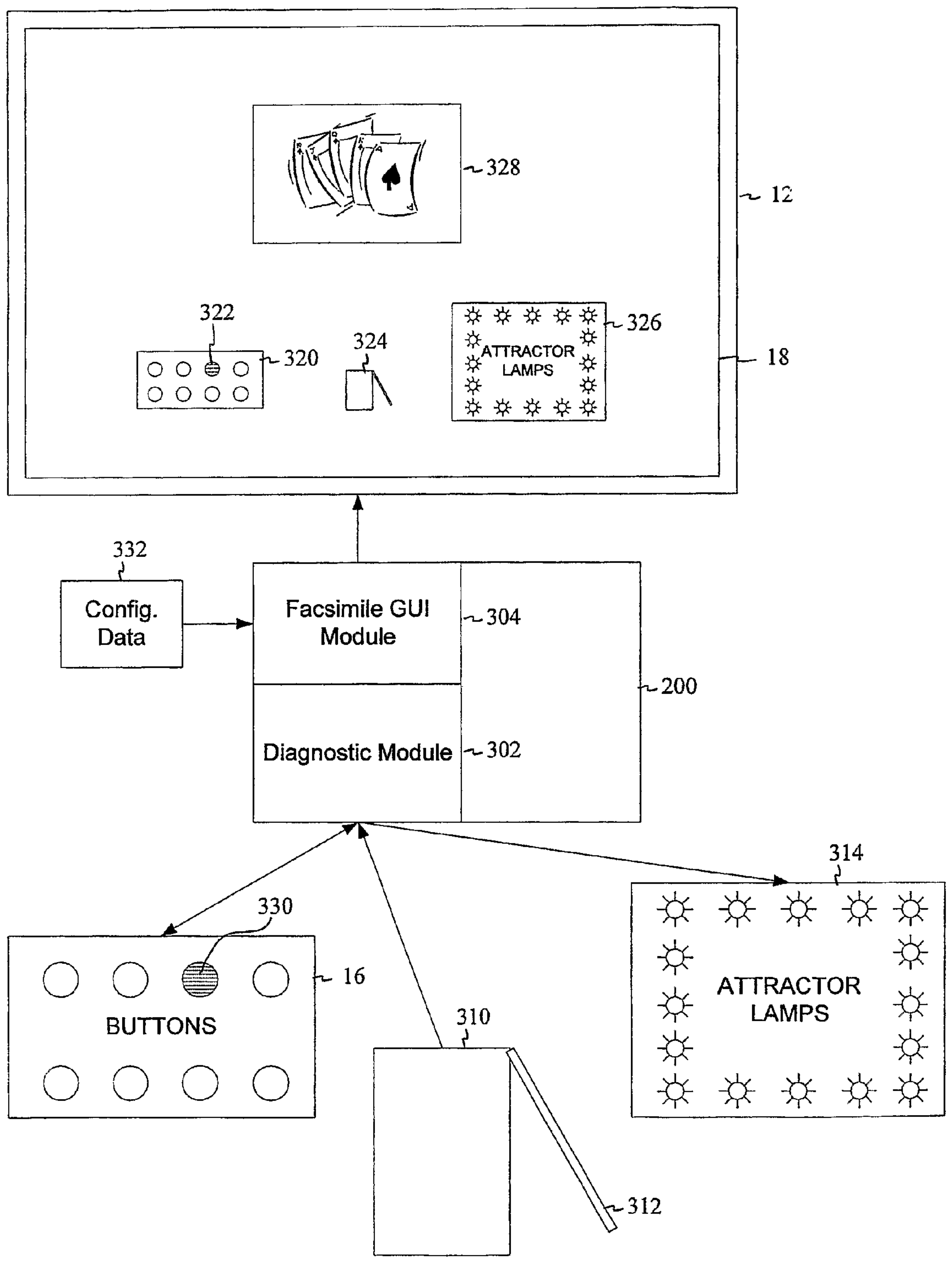
FIG. 3 is a block diagram illustrating the interaction between the physical components of a gaming machine and a user interface according to embodiments of the invention.

FIG. 3 is a block diagram illustrating the interaction between the physical components of a gaming machine and a user interface according to embodiments of the invention. In some embodiments, control system 200 includes a diagnostic module 302 and a facsimile GUI (Graphical User Interface) module 304. Diagnostic module 302 operates to execute diagnostics that test various physical components of a gaming machine, such as buttons 16, top box 40, door components 310, and attractor lamps 314. It will be appreciated that diagnostics to test other gaming machine components such as hoppers, credit/money detectors 14, lamps 30, and payoff mechanisms 26 also exist within diagnostics module 302, these other physical component are not included in FIG. 3 to avoid obscuring the inventive subject matter.

Facsimile GUI module 304 operates to display graphical objects on display 12 that represent the various physical components on the gaming machine. In general, the graphical objects substantially resemble the physical components they represent. For example, button graphical object 320 represents physical buttons 16, door graphical object 324 represents door components 310, attractor lamps graphical object 326 represents attractor lamps 314, and top box graphical object 328 represents top box 40. Again, other graphical objects may be used to represent other physical components of the gaming machine 10. It should be noted that the graphical object may include real images or idealized images. For example, a real image may be a digital picture (photographic) of the physical attribute. An idealized image may be more of a schematic like or stylized art representation of the attribute.

In some embodiments, the graphical objects provided on display 12 will represent configuration aspects for the gaming machine by displaying graphical objects for the physical components configured on the gaming machine. The configuration for the gaming machine may be obtained from configuration data 332. Configuration data 332 may come in a variety of forms, including data stored in memory on the gaming machine, switch positions on the gaming machine, or configuration files stored on the gaming machine. In some embodiments, the configuration data comprises configuration files conforming to an XML (eXtensible Markup Language) format. In addition to specifying the physical components on gaming machine 10, the configuration data may also specify text and text language that will be displayed on buttons and other user interface items on gaming machine 10. In addition, the configuration data may include button positions and colors, button base position and base colors, and may specify the location of graphics files containing graphics data for the graphical objects.

In operation, the facsimile GUI displays the graphical objects based on the configuration of the gaming machine. A user may verify a configuration by comparing the graphical objects on the display with the physical components on the gaming machine. A discrepancy may be used to indicate that the gaming machine is incorrectly configured.

In addition, the facsimile GUI may receive indications that the graphical objects have been selected. For example, touch screen 18 may be used to select graphical objects. In response to the selection, a diagnostic action may be executed for the physical component represented by the graphical object. For example, selecting a graphical image 322 of a button on graphical button object 320 may cause a lamp on corresponding physical button 330 to light. Similarly, pressing button 330 may cause the graphical image 322 of the button on graphical button object 320 to be modified to indicate that the button has been pressed. The graphical image may change color, become brighter, flash, or otherwise be highlighted.

Furthermore, user instructions can also be enhanced by the facsimile. An example is a jam of the ticket printer. The user may be offered a sequence of graphics. Each step of clearing the jam can be presented as a facsimile. Arrows an animation could be provided to instruct the user.

Further details on the operation of the facsimile graphical user interface will be provided below with reference to FIGS. 4 and 5.

Figure 4:
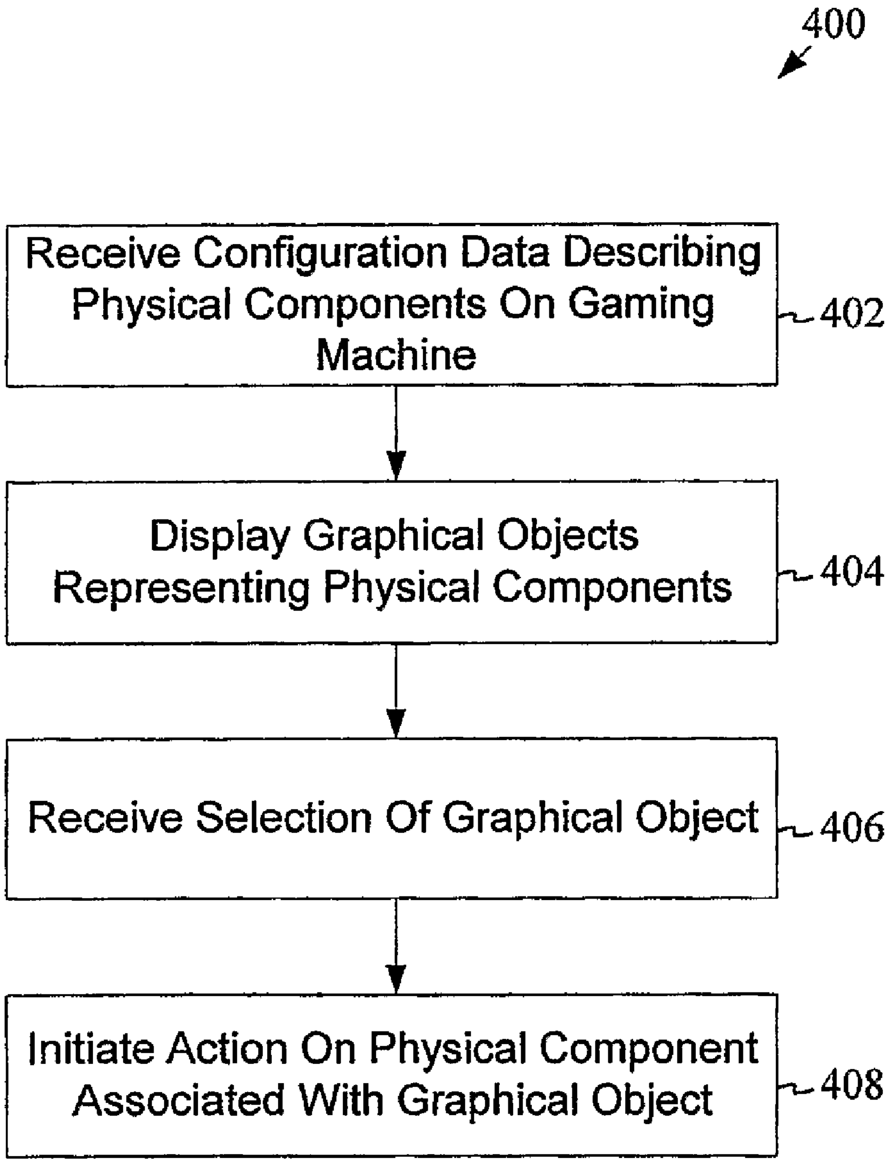
FIG. 4 is a flowchart illustrating methods for providing a facsimile graphical user interface on a gaming machine according to embodiments of the invention.

FIG. 4 is a flowchart illustrating a method 400 for providing a facsimile graphical user interface on a gaming machine according to embodiments of the invention. The method to be performed by the operating environment constitutes computer programs made up of computer-executable instructions. Describing the method by reference to a flowchart enables one skilled in the art to develop such programs including such instructions to carry out the method on suitable processors for gaming machines (the processor or processors of the computer executing the instructions from computer-readable media such as RAM, ROM, CD-ROM, DVD-ROM, flash memory, hard drives, floppy drives etc.). The method illustrated in FIG. 4 is inclusive of acts that may be taken by an operating environment executing an exemplary embodiment of the invention.

The method begins by receiving a configuration for physical components for a gaming machine (block 402). As noted above, the configuration may come from memory, switches, resister set combinations and/or one or more configuration files. In some embodiments, if a configuration is not available, the system may select graphical objects from a default set of graphical objects to represent the configuration of the gaming machine. Also, a user may alter the default graphics used on the gaming machine using and administrative interface.

A facsimile GUI executing the method then displays graphical objects representing the components specified in the configuration (block 404). In some embodiments, the graphical objects substantially resemble the physical components they represent. For example, if the gaming machine can accommodate multiple button panels each having different numbers or arrangement of buttons, the graphical object representing the button panel will have the same number of buttons or arrangement as the button panel currently configured on the gaming machine.

Next, the facsimile GUI receives a selection of a graphical object (block 406). In some embodiments, the selection is received through a touch screen interface overlaying the display on which the graphical objects are presented. However, the embodiments of the invention are not limited to selection through a touch screen interface, and those of skill in the art will appreciate that alternative selection methods may be used and are within the scope of the inventive subject matter.

In response to the selection, the facsimile GUI initiates an action on the physical component represented by the selected graphical object (block 408). The action may depend on the area of the graphical object selected, and the physical component represented by the graphical object.

In the case of a button panel, the facsimile GUI may be used to verify the integrity of buttons and button lamps on the button panel. If the facsimile GUI receives a selection of an area of a graphic object that represents a button on the button panel, the system lights the physical button lamp corresponding to the selected graphical image of the button. An area or special button on the graphical image may cause all of the button lamps to be lit.

In the case of a candle lamp, the facsimile GUI may be used to verify the configuration and integrity of the candle lamp. A graphical image of the candle lamp is displayed based on the configuration data. The configuration may include a jurisdiction and a denomination for the gaming machine. The graphical image may be compared to the actual candle to verify the configuration. Additionally, a factory setup may be utilized via the administrative interface to configure the diagnostic. Further, a casino operator may have a particular color scheme for the candle and the operator may use the administrative interface to setup the facsimile interface to represent the chosen color scheme.

In addition, the operation of the candle lamp may be tested. Upon receiving a selection of a graphical image of a candle lamp, the system causes the corresponding physical candle lamp to be lit. In some embodiments, a GUI button is provided on the display that causes all of the physical candle lamps to be lit when the GUI button is selected.

Attractor lamps may be tested in a manner similar to the candle lamps.

In the case of a top box, selection of a graphical image of the top box may activate the top box display. This may include displaying a video on the top box, or causing the motorized mechanical movement of items in the top box.

Figure 5:
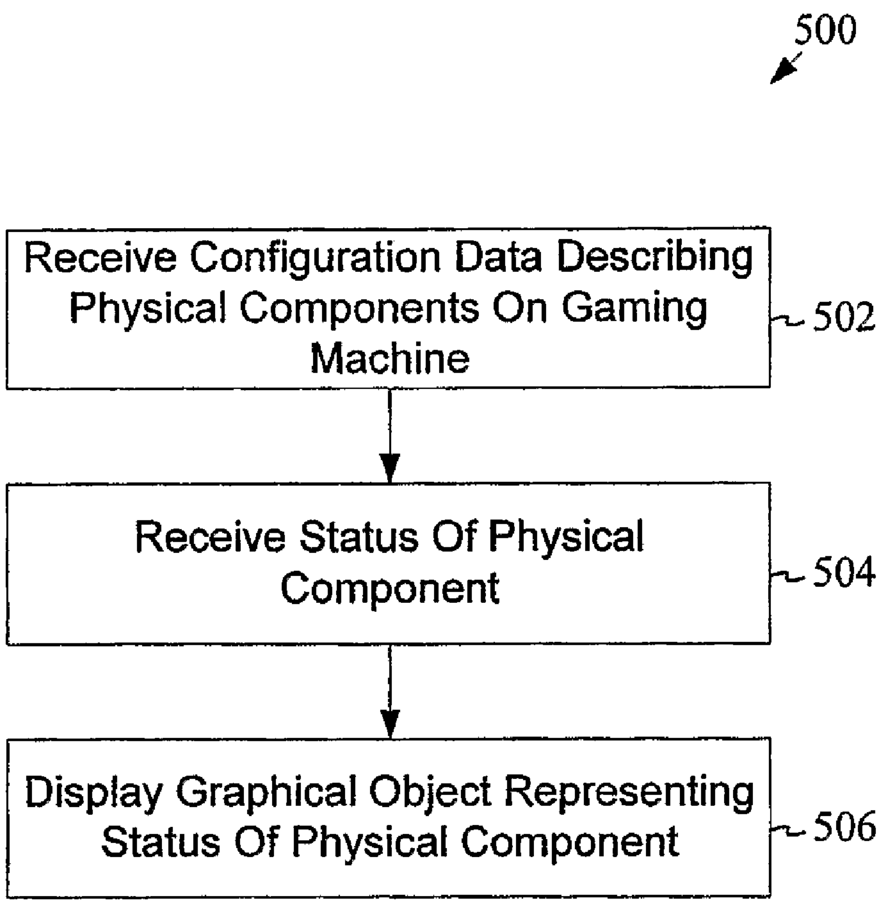
FIG. 5 is a flowchart illustrating methods for providing a facsimile graphical user interface on a gaming machine according to alternative embodiments of the invention.

FIG. 5 is a flowchart illustrating a method 500 for providing a facsimile graphical user interface on a gaming machine according to alternative embodiments of the invention. The method begins by receiving a configuration for a gaming machine (block 502). As noted above, the configuration may include configuration data, configuration switches, resister sets and/or one or more configuration files.

Next the system receives a status for a physical component of the gaming machine (block 504). In response to receiving the status, a graphical object representing the physical component is displayed or the current display of the graphical object may be modified to indicate the status (block 506). The display of the graphical object will depend on corresponding physical component and the specific status.

For example, in the case of a button panel, when a user presses a physical button on the gaming machine thereby changing the status of the button, the graphical image representing the button on the display is modified to indicate the button has been pressed. The graphical button image may be represented as lit, it may flash, or some other highlighting mechanism may be used to indicate the button press. When the button is no longer pressed, the graphical image of the button may be modified to indicate the change in status by no longer lighting, flashing or otherwise highlighting the button image.

In some embodiments, a latch mode button press test may be provided. In these embodiments, a latch mode GUI button may be provided to initiate the latch mode. In latch mode, a physical button press causes the corresponding graphical image of the button to be lit, flash, or otherwise highlighted (e.g. latched), even when the user stops pressing the button. The graphical image of the button remains in the highlighted state until the latch mode is exited by pressing the latch mode GUI button.

In the case of a door or set of doors on the gaming machine cabinet, the graphical image representing the door or set of doors will reflect the current status of the door. The status may include whether the door is opened or closed, and whether the door needs attention from a gaming establishment operator. For example, the graphical image of a set of doors may indicate that an inner door needs attention while an outer door is closed. Additionally, the graphical image may be used to indicate whether an admin button for a door has been pressed or an admin key for a door has been turned.

In the case of a coin hopper, a graphical image of a hopper may be displayed indicating that the status of the hopper is "jammed".

CONCLUSION

Systems and methods for providing a facsimile graphical user interface on a gaming machine have been disclosed. The systems and methods described provide advantages over previous systems. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A gaming system providing a picture-based user interface for configuring and diagnosing a physical component of the system, the system comprising:

at least one display device;

at least one processor; and a memory device that stores a diagnostic module and a facsimile graphical user interface (GUI) module operably coupled to the diagnostic module, the diagnostic module, when executed by the at least one processor, causing the at least one processor to operate with the at least one display device and the facsimile GUI module to:

provide a representation of a system configuration by displaying at least one pictorial object on the at least one display device, the at least one pictorial object depicting at least the physical component of the gaming system; and receive a status of the physical component and modify the at least one pictorial object according to the received status of the physical component; wherein the facsimile GUI module initiates an action on the physical component in response to a selection of the at least one pictorial object.

2. The gaming system of claim 1, wherein the at least one pictorial object is selectable by a user, via an input device.

3. The gaming system of claim 2, wherein the input device comprises a touch screen input device placed over the at least one display device.

4. The gaming system of claim 1, wherein the at least one pictorial object comprises a button image and the physical component comprises a corresponding button, and wherein the action comprises lighting a lamp on the corresponding button.

5. The gaming system of claim 1, wherein the at least one pictorial object comprises an image of a set of one or more lamps and the physical component comprises a set of one or more physical lamps and wherein the action comprises lighting at least one of the set of one or more physical lamps.

6. The gaming system of claim 1, wherein the set of physical lamps comprise at least one candle lamp.

7. The system of claim 1, wherein the set of physical lamps comprise attractor lamps.

8. The gaming system of claim 1, wherein the physical component comprises a button and wherein the status comprises the button being pressed and wherein the modified pictorial object comprises a highlighted button image.

9. The gaming system of claim 1, wherein the physical component comprises a door and wherein the modified pictorial object depicts the open door.

10. The gaming system of claim 1, wherein the physical component comprises a hopper and wherein the modified pictorial object indicates the hopper is jammed.

11. The gaming system of claim 1, wherein the selection initiates a default configuration for the gaming system.

12. The gaming system of claim 1, wherein the facsimile GUI module displays a set of one or more pictorial objects that depict directions for handling a condition of the gaming system.

13. A method comprising:

diagnosing at least one physical component of a gaming system, the gaming system including at least one processor and at least one display device, wherein diagnosing includes:

providing gaming system configuration of the gaming system information to a user by displaying, via the at least one display device, one or more pictorial objects depicting the at least one physical component of the gaming system;

receiving a status of the at least one physical component; and modifying the one or more pictorial objects according to the received status of the at least one physical component; receiving, via an input device of the gaming system, an input indicating a selection of the at least one physical component; and initiating an action on the at least one physical component, in response to the selection.

14. The method of claim 13, wherein the status indicates that a door of the gaming system is open, and the one or more pictorial objects depict the open door.

15. The method of claim 13, further comprising:

detecting, via a detector device, the status of the physical component and reporting the detected status to a diagnostic module of the gaming system.

16. The method of claim 13, wherein the input device comprises a touch screen device positioned over the at least one display device.

17. The method of claim 13, wherein the one or more pictorial objects comprise a button image and the at least one physical component comprises a corresponding button, and wherein the action comprises lighting a lamp on the corresponding button.

18. A computer-readable, non-transitory medium including executable instructions which when executed by at least one processor cause to the processor to:

diagnose at least one physical component of a gaming system, the gaming system including at least one display device, wherein diagnosis includes:

providing gaming system configuration information of the gaming system to a user by displaying, via the at least one display device, one or more pictorial objects depicting the at least one physical component of the gaming system;

receiving a status of the at least one physical component; and modifying the one or more pictorial objects according to the received status of the at least one physical component; receiving, via an input device of the gaming machine, an input indicating a selection of the at least one physical component; and initiating an action on the at least one physical component, in response to the selection.

19. The computer-readable medium of claim 18, wherein the status indicates that a door of the gaming system is open, and the one or more pictorial objects depict the open door.

20. The computer-readable medium of claim 18, wherein the instructions, which when executed by the at least processors, further cause the processor to:

depict a set of instructions via one or more of the one or more pictorial objects.

* * * * *

UNITED STATES PATENT AND TRADEMARK OFFICE

CERTIFICATE OF CORRECTION

PATENT NO. : 8,226,475 B2
APPLICATION NO. : 11/576391
DATED : July 24, 2012
INVENTOR(S) : Andrew G. Trobia It is certified that error appears in the above-identified patent and that said Letters Patent is hereby corrected as shown below:

In column 1, line 67, delete “far simile” and insert --facsimile--, therefor

In column 3, line 16, delete “futures” and insert --future--, therefor

Signed and Sealed this
Twenty-third Day of October, 2012

David J. Kappos
*Director of the United States Patent and Trademark Office*